Feb. 12, 1952   G. E. MONTGOMERY   2,585,154

DRIVE FOR ROTARY MECHANICAL SEALS WITH "O" RINGS

Filed Nov. 26, 1947

INVENTOR.
George E. Montgomery
BY
Charles P. Vnytich
Atty.

UNITED STATES PATENT OFFICE 2,585,154

DRIVE FOR ROTARY MECHANICAL SEALS WITH O RINGS

George E. Montgomery, Chicago, Ill., assignor to Crane Packing Company, Chicago, Ill., a corporation of Illinois Application November 26, 1947, Serial No. 788,223

2 Claims. (Cl. 286—11.15)

This invention relates to mechanical rotary seals for pumps or the like wherein a rigid sealing washer is used to effect a seal on a radial plane.

The object of this invention is to provide a seal of the mechanical type for rotary apparatus wherein the seal utilizes an endless ring having a circular radial cross-section and commonly known as an O ring, to effect a seal between the washer and one of the relatively rotatable elements to be sealed, and in which separate means are provided to prevent relative rotation between the washer and the element to which it is sealed, said separate means being of simple construction and serving additionally to confine the O ring to a predetermined location relative to the washer.

Figure 1:
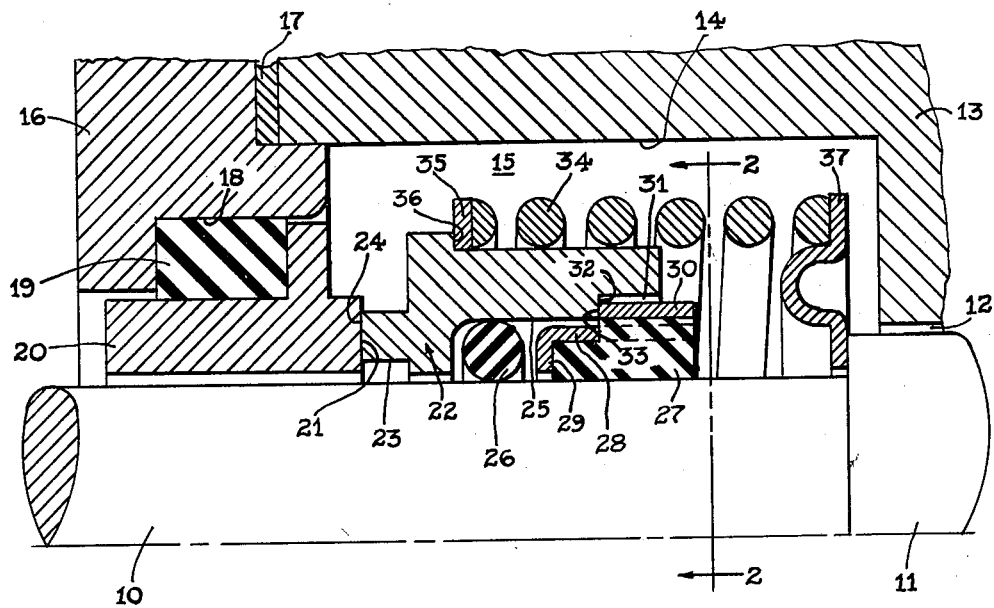
Figure 2:
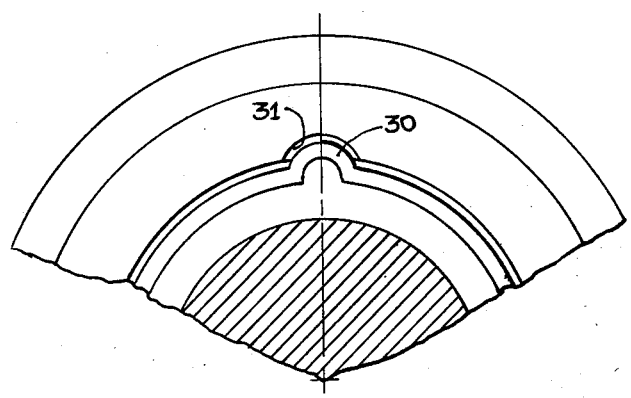

The stated object of this invention and other objects will become apparent from the following detailed description when taken together with the accompanying drawings, in which Fig. 1 is a quarter-sectional view of a rotary mechanical seal embodying the features of this invention;

Fig. 2 is a fragmentary elevation taken along line 2—2 of Fig. 1 showing the means for preventing relative rotation between the washer and the element to which it is sealed.

Referring now to the drawings for a detailed description of the invention, there is shown a shaft 10 having an enlarged stepped portion 11 passing through an opening 12 in housing 13. Said housing has a recess 14 forming with shaft 10 a seal chamber 15. The left-hand end of chamber 15 as viewed in Fig. 1 is defined by a closure-plate 16 which is bolted or otherwise secured to housing 13. A gasket 17 serves to effect a fluid-tight seal between housing 13 and closure-plate 16.

A recess 18 is formed in plate 16 to receive an endless ring 19 of resilient deformable material such as rubber, either natural or synthetic, or a combination of the two, which supports a seat ring 20 of rigid material. Said ring 20 is of such diameter as to cause ring 19 to be compressed into recess 18 and form a fluid-tight seal between seat ring 20 and closure-plate 16. The seat ring 20 has a radially disposed surface 21 which is suitably ground and lapped so as to be perfectly flat and smooth. Seat ring 20 is free to float or otherwise adjust its position relative to closure-plate 16 as dictated by the seal hereinafter to be described.

Cooperating with seat ring 20 is a washer 22 having a laterally extending rib 23 facing seat ring 20, rib 23 being provided with a radially disposed surface 24 which is ground and lapped so as to be perfectly smooth to form a fluid-tight running fit with seal seat 20. Washer 22 has a recess 25 adjacent shaft 10 into which is compressed an endless ring 26 of rubber, either natural or synthetic, or a combination of the two, said ring having a circular radial cross-section and known commonly as an O ring. It is understood that other materials can be substituted for rubber provided they are resilient and deformable. The dimensions of recess 25 with relation to the dimensions of O ring 26 are such that the ring is under initial compression when installed into the recess.

Ring 26 provides a fluid-tight seal between washer 22 and shaft 10 and at the same time permits washer 22 to move axially and to some extent radially relative to shaft 10.

In order to relieve O ring 26 of any torque load that might be imposed upon it by virtue of the resistance of washer 22 to movement with shaft 10, a driving means is provided, the driving means at the same time being utilized to prevent ring 26 from working itself out of recess 25. The driving means is comprised of a ring 27 preferably of resilient deformable material, which is pressed upon shaft 10 by a band 28 of rigid material. Said band has a flange 29 extending radially inwardly along the left-hand edge (Fig. 1) of ring 27 so that when ring 27 is pushed upon shaft 10 on the left-hand end thereof as viewed in Fig. 1, flange 29 will prevent ring 27 from sliding over the band. Said band is provided with one or more radially outwardly extending lugs 30 having a somewhat semi-circular form as shown in Fig. 2 and extending into axially disposed notches 31 in washer 22. Lugs 30 prevent washer 22 from rotating relative to the flange 28 but permit the washer to move axially in response to wear or axial vibration. When the seal is assembled upon shaft 10, the ends 32 of notches 31 strike the end 33 of lugs 30 before ring 26 can be compressed between washer 22 and flange 29 and thus the axial dimension of the space in which ring 26 operates is determined.

It will be observed that when the seal is installed, flange 29 serves to define the space in which ring 26 operates and thus prevents ring 26 from working its way out of recess 25.

Washer 22 is held against ring 20 by means of a spring 34 which is telescoped over the outside of surface of washer 22 and transmits its pressure through a washer 35 to a shoulder 36 formed on washer 22. The reaction of spring 34 is taken by a spring holder 37 which in turn abuts on the shoulder formed by enlarged portion 11 on shaft 10.

It is understood that the foregoing description is illustrative of preferred embodiments of this invention and that the scope of the invention is not to be limited thereto, but is to be determined by the appended claims.

What is claimed is:

1. A device for effecting a fluid-tight seal between relatively rotatable elements comprising a sealing washer encircling one of the elements and a resilient deformable sealing ring compressed radially by the washer against the said one element, said device being characterized by means for preventing relative rotation between the washer and said one element comprising a band adjacent the sealing ring, a resilient ring compressed solely in a radial direction between the band and said one element to secure the band to the said element frictionally, a connection between the band and washer providing relative axial movement but preventing relative rotational movement between the band and washer, and a radially inwardly disposed flange on the band adjacent the sealing ring and limiting axial movement of the said sealing ring in the direction of the band.

2. A device for effecting a seal between a shaft and a housing for the shaft wherein a sealing washer encircles the shaft and is provided with a recess adjacent the shaft, and an endless sealing ring of flexible deformable material is located in the recess and compressed between the washer and shaft to form a fluid-tight seal, said device being characterized by means for preventing relative rotation between the washer and shaft, comprising a band located in the recess adjacent the ring, means compressed solely in a radial direction between the band and shaft for driving the band frictionally from the shaft, and lugs on the band, said washer having axially disposed notches in the recess into which the lugs extend.

GEORGE E. MONTGOMERY.

REFERENCES CITED

The following references are of record in the file of this patent:

UNITED STATES PATENTS

| Number | Name | Date |
|--------|------|------|
| 1,835,877 | Joyce | Dec. 8, 1931 |
| 2,393,944 | Walley | Jan. 29, 1946 |
| 2,410,927 | Callahan et al. | Nov. 12, 1946 |